United States Patent [19]
Grant

[11] 3,923,922
[45] Dec. 2, 1975

[54] EPOXY-CROSSLINKED, FOAMED NITRILE CONTAINING POLYMERS AND METHOD OF PREPARING SAME

[75] Inventor: Thomas S. Grant, Vienna, W. Va.

[73] Assignee: Borg-Warner Corporation, Chicago, Ill.

[22] Filed: Aug. 19, 1974

[21] Appl. No.: 498,784

Related U.S. Application Data

[63] Continuation-in-part of Ser. No. 301,386, Oct. 27, 1972, abandoned, which is a continuation of Ser. Nos. 104,520, Jan. 7, 1971, abandoned, and Ser. No. 301,387, Oct. 27, 1972, abandoned, which is a continuation of Ser. No. 104,521, Jan. 7, 1971, abandoned.

[52] U.S. Cl. ......... 260/2.5 EP; 260/2.5 E; 260/835; 260/836; 260/2.5 N; 260/837 R; 260/837 PV; 260/876 R
[51] Int. Cl.² ...................... C08J 9/00; C08L 63/00
[58] Field of Search ............ 260/2.5 E, 2.5 EP, 836, 260/837

[56] References Cited
UNITED STATES PATENTS

| | | | |
|---|---|---|---|
| 2,945,827 | 7/1960 | Henning | 260/2.5 E |
| 2,945,828 | 7/1960 | Henning | 260/2.5 E |
| 2,948,665 | 8/1960 | Rubens et al. | 260/2.5 HA |
| 3,098,831 | 7/1963 | Carr | 260/2.5 HA |
| 3,098,832 | 7/1963 | Pooley | 260/2.5 HA |
| 3,111,496 | 1/1963 | Hunter | 260/2.5 R |
| 3,322,853 | 5/1967 | Tremontoggi | 260/837 |
| 3,341,481 | 9/1967 | Palmer | 260/2.5 HA |
| 3,468,834 | 9/1969 | Oda et al. | 260/32.8 |
| 3,496,250 | 2/1970 | Czerwinski | 260/836 |

Primary Examiner—Richard B. Turer
Attorney, Agent, or Firm—Richard J. Schlott

[57] ABSTRACT

Nitrile - containing thermoplastic compositions, when lightly crosslinked by compounding with from 0.1 to about 1.0% by weight of an epoxy compound and with 0.1 to about 1.0% of a suitable curing agent, and cured by compounding at temperatures in excess of 350° F, are capable of being thermally processed by injection molding and extrusion processes and exhibit improved hot-strength characteristics compared with the uncrosslinked thermoplastic. The crosslinked compositions retain sufficient thermoplastic character to permit foaming, and when additionally compounded with a blowing agent, may be extruded or injection-molded to give structures exhibiting a smooth skin and a uniform cellular structure, which have hot strength properties adequate for postforming operations.

9 Claims, No Drawings

EPOXY-CROSSLINKED, FOAMED NITRILE CONTAINING POLYMERS AND METHOD OF PREPARING SAME

CROSSREFERENCE TO RELATED APPLICATIONS

This application is a continuation in part of Ser. No. 301,386 filed Oct. 27, 1972 now abandoned which was a Continuation of Ser. No. 104,520, filed Jan. 7, 1971, now abandoned and of Ser. No. 301,387 filed Oct. 27, 1972 now abandoned which was a continuation of Ser. No. 104,521 filed Jan. 7, 1971, now abandoned.

BACKGROUND OF THE INVENTION

Polymer compositions are normally divided into two major categories, namely, thermoplastics, i.e., those that can be easily worked and reworked through the application of heat and those that are known as thermoset which generally are not easily worked through the application of heat, and once formed, retain their shape as a result of crosslinking that occurs throughout the polymeric structure.

The thermosets, though not as easily fabricated into shaped objects as thermoplastics, often have physical properties superior to those of the thermoplastics using the same basic polymeric structure. Generally, they also have better dimensional stability, particularly at high temperatures and less tendency to creep, better chemical resistance and generally better solvent resistance. Perhaps the most generally cited advantages of thermosets is their heat distortion temperature, i.e., thermoset compositions normally have higher heat distortion temperatures. Thermoplastic compositions are normally converted to thermoset compositions by the addition of crosslinking agents such as multivalent esters, epoxies, isocyanates, etc., depending, of course, on the thermoplastic polymer being transformed to a thermoset.

THE INVENTION

The instant invention provides a thermoplastic polymeric material containing nitrile groups with a thermoset character by the addition of monomers and polymers containing epoxy groups in the presence of a curing agent. The compositions exhibit improved creep resistance, good chemical resistance, high melt viscosities and tensile properties, yet are capable of being formed as thermoplastics. The compositions are compounded by interblending the components of the composition in the polymeric melt phase at sufficiently high temperatures to melt blend the components and substantially crosslink the nitrile-containing thermoplastic. The crosslinking within the nitrile-containing thermoplastic is maintained at a low level, and the key to retaining thermoplastic characteristics is that the crosslinking level is not so great that the non-processability characteristics of true thermosets result. The compositions are then formed into pellets which are subsequently melted and formed into shaped articles.

The crosslinking occurs through the addition of a small amount, i.e., from 0.1 up to about 1.0% of epoxy containing compound. The preferred range is 0.1 by weight to 0.6% by weight epoxy containing compounds. The formed articles of the crosslinked compositions retain their inherent physical properties, will remain dimensionally stable over a wide temperature range, and thus have hot-strength properties at temperatures near the processing temperature.

Nitrile groups are required in the thermoplastic compositions for proper crosslinking to occur in accordance with the instant invention. These nitrile groups may be derived from a variety of sources. For example, unsaturated nitrile monomers such as acrylonitrile, and substituted acrylonitrile may be used in preparing the thermoplastic homopolymers and copolymers. Condensation polymers containing nitrile groups may also be used in the process of this invention.

Copolymers useful in this invention include styrene-acrylonitrile copolymers, methyl methacrylatestyrene-acrylonitrile terpolymers, methyl methacrylateacrylonitrile, vinylidene chloride-acrylonitrile, vinyl acetate-acrylonitrile copolymers, ABS graft copolymers including conventional graft copolymers of acrylonitrile and styrene on preformed polybutadiene and the like. The process of this invention is also applicable to blends wherein a nitrile-containing polymer is combined with other polymers not containing nitrile such as PVC, polycarbonate, chlorinated polyethylene, etc. The polymers are not limited to those prepared by any given method. The polymers may be prepared for example by emulsion polymerization, polycondensation, etc., so long as they contain nitrile groups. The melt mixing of the thermoplastic components, including the nitrile-containing monomers or polymers with the epoxy and curing agent is carried out at a temperature at which crosslinking will take place, i.e., at a temperature of from about 350°F to about 500°F in a Banbury mixer or similar mixer capable of fluxing the polymeric components. The thus melt mixed, cross-linked composition is then pelletized.

As mentioned, in order to have crosslinking occur, it is necessary that there be a curing agent present. Also, curing can occur through an acid environment of the polymeric compounds which is often the case in ABS graft copolymers. By acid environment, it is meant that an acid is present such as a mineral acid, acidic salt of a mineral acid or a Lewis acid such as boron trifluoride amine complex. The amount of acid required, as a promoter and/or crosslinking agent, may be as low as 0.1% by weight and as high as 1.0% by weight of the composition.

The thermoplastic compositions of this invention may be either solid compositions or alternatively cellular compositions through the addition of expanding agents. The solid or cellular compositions may in turn be reinforced with fillers such as fiber glass, asbestos, silica or organic fibers. The cellular compositions or the solid compositions containing the crosslinking materials are generally more dimensionally stable at high temperatures, have improved creep resistance and improved chemical resistance.

The epoxy resins utilized in this invention are normally prepared by reacting an epoxide-containing compound such as epichlorohydrin with a polyhydric compound such as glycerine or a bisphenol in the presence of sufficient basic material to bind the hydrochloric acid to form epoxy-terminated prepolymers. Epoxies may also be prepared by epoxidation of polyolefins with a peroxidizing agent such as peracetic acid. The resins formed vary according to the molar proportions and reaction conditions and having melting points ranging from about 0°C. to about 165°C. and an epoxy equivalent weight between about 70 and 6,000. There are a great variety of epoxy resins which are available commercially in a wide range of epoxy content, molecular weight, softening point and compositions. For example, it has been found that epoxy resins such as diglycidyl and triglycidyl ethers of glycerol (e.g., Epon 812) having epoxy equivalents of 140–160; epichlorohydrin-bisphenol A type epoxies (e.g., Epon 1,010, having epoxy equivalents of 4,000–6,000); aromatic epoxies such as DEN 438 a polyglycidyl ether of phenolformaldehyde novolac having an epoxy equivalent weight of 176–181 and a viscosity at 52°C. of 35,000–70,000 centipoises; olefinic oxides (e.g., Nedox 1518); cycloaliphatic epoxies (e.g., Erla 4206 having an epoxy equivalent of 74–78); Epon 828 as well as modified epoxy resins such as Epon 815, Epon 828 diluted with 11% butyl glycidyl ether having an epoxy equivalent weight 175 to 195 and a viscosity of 500–700 centipoises at 25°C. The modified epoxies utilized may be blended with either a second epoxy, a plasticizer or the like. The specific epoxy resins utilized in the examples are Epon 828, a di-glycidyl ether of bisphenol A, and Epon 221, an epoxycyclohexylmethyl epoxycyclohexane carboxylate.

The thermoplastic polymers, the epoxy resin, the curing agent and the lubricant are melt mixed on a small Banbury mixer at a temperature between 350°F. and 400°F. to provide a substantial crosslinking on the Banbury. The melt mixed compositions are formed into pellets and the pellets are utilized for the extrusion and molding of shaped objects. While the crosslinking of the compositions materially reduces the flow properties of the compositions, they can still be extruded and injection molded provided that the crosslinking level of the composition is maintained at the low levels disclosed herein below. Articles thus produced have improved dimensional stability at high temperatures, improved hot-strength during thermal processing, improved creep resistance and good chemical resistance.

Suitable foaming agents for making cellular compositions in accordance with this invention are disclosed in U.S. Pat. Nos. 3,111,496 and 3,442,829, especially the alkali metal azodicarboxylate of the former patent and the 5-hydrocarbyltetrazole of the latter patent. Also useful is Celogen AZ (azodicarbonamide marketed by Uniroyal, Inc.).

EXAMPLE 1

COMPOUNDING ABS, EPOXY COMPOUND AND BLOWING AGENT

The following is an example of a composition of the present invention useful for the extrusion or molding of a foamed article:

A graft ABS polymer (100 parts) containing 25 parts by weight acrylonitrile, 15 parts by weight 1,3-butadiene and 60 parts by weight styrene in the form of a conventional graft of acrylonitrile and styrene on a preformed polybutadiene substrate, was mixed with 1% by weight pluronic F-38 lubricant, 0.3% by weight EPON 828 epoxy resin and 0.2% by weight $BF_3MEA$ on a Banbury mixer at 350° – 450°F for 4 minutes to assure crosslinking of the composition. The composition was pelletized and 100 parts of pellets were tumbled with 0.5 parts of azodicarbonamide for 5 minutes in a rotary tumbler to assure intimate contact and coating of the pellets with azodicarbonamide.

EXAMPLE 2

INJECTION MOLDING

Coated pellets prepared as in Example 1 were injection-molded in a ram injection molding machine employing a stock temperature between 400°–500°F. to form a test plaque. The resulting plaque was foamed, having a density of 0.55 grams per cubic centimeter, a uniform cell structure and a hard smooth surface.

EXAMPLE 3

EXTRUSION

Coated pellets prepared as in Example 1 were extruded. A conventional screw-extruder was employed, fitted with a ribbon die. The extrusion was carried out at stock temperatures near 450° F. The extruded strip was foamed to a density of 0.6 g/cc with uniform cell structure and smooth, hard surface. The strip was uniform in profile and had sufficient hot-strength and integrity to permit a post-forming of the strip into rectangular, curved and angle profiles by further shaping operations before cooling.

EXAMPLE 4

ABS FOAM EXTRUSION

The ABS graft polymer employed in the preparation of Example 1 was pelletized without the addition of EPON 828 and $BF_3MEA$. The pellets were mixed with azodicarbonamide as before at the ratio 0.5 parts per 100 parts pellets, and extruded. The extrudate, though foamed, was overblown due to lack of hot strength, had no smooth surface, tended to melt fracture, and would not retain a uniform profile. Attempts to postform the extrudate while hot were unsuccessful due to lack of hot-strength, and expansion continued well-beyond the die-exit.

It will be apparent from comparing the results of Examples 3 and 4 that foam extrusion is effectively a free-blown condition. Extrudate having good hot-strength resulting from pre-crosslinking as shown in Example 3 will be capable of forming an external hard, smooth surface "skin" to retain a shape near the foaming temperature. Extrudate having no pre-crosslinking and therefore no hot-strength as in Example 4 does not form the necessary skin and cannot contain the expansion or retain a shape under a free-blow condition near the foaming temperature; such compositions cannot be further handled or post-formed. Uncrosslinked materials of the composition of Example 4 require external pressure while cooling to contain the foam and are best processed into foams under restraint such as in molds, as for example by injection molding. Materials of this invention, by virtue of the presence of the necessary crosslinking, may be successfully processed by injection molding or by extrusion.

When crosslinking a thermoplastic composition containing a nitrile group in accordance with the practice of this invention, it is essential that no more than 1.0% by weight of the curing agent be employed since otherwise the thermoplastic composition will over-crosslink, become powdery on the Banbury mixer and incapable of being extruded or foamed, due to inability to undergo hot melt flow. The importance of restricting the level of crosslinking is shown by the following examples, wherein melt index is used as a measure of the ability of a composition to exhibit hot melt flow.

In the following examples, the thermoplastic composition, the epoxy compound, the curing agent and a lubricant were melt-mixed on a small Banbury mixer at a temperature below 300° F to prevent any substantial crosslinking in the Banbury. It will be understood that melt-mixing without crosslinking, followed by molding into sheets and crosslinking is necessary for the purposes of these comparative examples since as was said hereinabove, the more highly crosslinked materials containing high levels of epoxy compound become powdery and unprocessable if allowed to crosslink during melt mixing. The melt-mixed composition was formed into sheets and the sheeted composition was compression-molded at 450°F for 10 minutes to assure crosslinking, then cut into test pieces for physical testing. While 10 minutes at 450°F was employed in the examples, it has been found that substantial crosslinking of the compositions will occur in as little as 3 minutes at temperatures of from about 400° to 500° F.

these particular levels of crosslinking the composition remains sufficiently thermoplastic to be further melt processed. When mixed with a suitable foaming agent the resulting blend can be extruded to give extruded foam profiles having a hard smooth surface and uniform cell structure, whereas compositions containing no epoxy resin crosslinking have insufficient hot strength to permit successful foam profile extrusion. It will be understood that extrusion of compositions of this invention may also be carried out without foaming agents present and may be desirable where non-foam extrusion requires added hot strength for a particular application. It will also be understood that extrusion of these crosslinked compositions is possible only because

TABLE 1

| Example No. | 5 | 6 | 7 | 8 | 9 | 10 | 11 | 12 | 13 | 14 | 15 | 16 | 17 |
|---|---|---|---|---|---|---|---|---|---|---|---|---|---|
| PolySAN[1] | 100 | 100 | 100 | 100 | — | — | — | — | — | — | — | — | — |
| ABS[2] | — | — | — | — | 100 | 100 | 100 | 100 | 100 | 100 | 100 | — | — |
| PolyStyrene[3] | — | — | — | — | — | — | — | — | — | — | — | 100 | 100 |
| EPON 828[4] | .1 | .5 | 3.5 | — | — | .1 | 0.5 | 1.0 | 3.5 | — | — | — | 3.5 |
| Epoxide 221[5] | — | — | — | 0.1 | — | — | — | — | — | .1 | .5 | — | — |
| BF$_3$MEA[6] | .3 | .3 | .3 | — | — | .3 | .3 | .3 | .3 | .3 | .3 | — | .3 |
| Potassium Persulfate | — | — | — | 1.0 | — | — | — | — | — | — | — | — | — |
| Melt Index[7] | 3.2 | 0.2 | WNE | 3.4 | 7.0 | 5.4 | .9 | .1 | WNE | 3.0 | WNE | 13.4 | 15.3 |
| HDT °F[8] | 209 | 206 | 207 | — | 171 | 173 | 172 | 172 | 172 | 172 | 172 | 193 | 183 |

Notes:
[1] A copolymer of styrene and acrylonitrile (70/30 ratio), containing 1% Pluronic F-38 as a lubricant
[2] An acrylonitrile-butadiene-styrene (25/15/60 ratio) graft copolymer-containing 1% Pluronic F-38 as a lubricant of acrylonitrile and styrene on polybutadiene
[3] Impact Polystyrene (Styrene/Butadiene, ratio 93/7) containing 1% Pluronic F-38 as a lubricant. Pluronic F-38 is a product of the Wyandotte Chemical Company; it is a polyethylene oxide-polypropylene oxide glycol.
[4] Epon 828 is a product of Shell Chemical Company; it is a liquid di-glycidyl ether of bis-phenol A.
[5] Epoxide 221 is a product of the Union Carbide Corporation; it is epoxycyclohexylmethyl epoxy cyclohexane carboxylate.
[6] BF$_3$MEA is the boron trifluoride-monoethylamine complex.
[7] Melt index at 450°F (A$^1$); g/min; WNE = will not extrude.
[8] HDT = heat distortion temperature, °F.

It will be apparent from the melt index data that high levels of crosslinking (Examples 7, 13 and 15) will effectively prevent melt flow and therefore melt processing by extrusion, injection molding, etc., after cure of the composition. Additionally, inasmuch as successful foaming requires that the composition undergo melt flow, compositions incapable of melt flow will not be successfully foamed by the process disclosed in this invention. Where the crosslinking level is low, limited by the amount of the epoxy compound employed, as in examples 1–3, 5, 6, 8, 10, 11, and 14, both processing by extrusion and foaming are possible. Near the limiting level of 1.0% epoxy compound, extrudability becomes more difficult, and at higher levels, impractical. Example 12 demonstrates that at a level near 1% melt flow capability is severely limited when Epon 828 epoxy resin is employed, while for Epoxy 221, (Example 15) a level of 0.5% is sufficient to effectively stop melt flow. It is thus apparent that optimization will be necessary in selecting the proper amount of crosslinking epoxy compound for the particular thermoplastic employed, in order to ensure that processability is retained.

Examples 16 and 17 are compositions made with impact polystyrene, a thermoplastic having no nitrile groups. These melt index data demonstrate that the presence of nitrile groups is necessary for obtaining effective crosslinking.

The invention herein disclosed is thus a composition comprising a nitrile-containing thermoplastic, an epoxy resin compound in the amount 0.1 to about 1.0% by weight and a curing agent for the epoxy compound in the amount no greater than about 1.0% by weight which has been processed thermally at temperatures between 350° and 500°F to effect a crosslinking. At the level of epoxy resin compound is low and where these low levels are exceeded the resulting composition will be difficult or impossible to extrude and/or foam.

It will be understood that the invention has been described with certain specific polymeric compositions, however, this is by way of illustration and not by way of limitation and the invention is defined solely by the appended claims which should be construed as broadly as is consistant with the prior art.

I claim:

1. A method of making a crosslinked, thermally processable composition comprising the steps of (1) melt mixing a blend comprising a thermoplastic copolymer selected from the group styrene-acrylonitrile copolymers, graft copolymers of styrene and acrylonitrile on rubbery polydiene substrates, and mixtures thereof, an epoxy resin in the amount of from 0.1 to about 1.0% by weight of said composition, and an acidic curing agent for epoxy resin in the amount of from about 0.1% to about 1.0% by weight of the said composition at a temperature greater than about 350°F., to thereby cure and crosslink said blend, and (2) cooling and pelletizing said blend.

2. The method of claim 1 further comprising the step of mixing said pelletized blend with a foaming agent in the amount of from about 0.1% to about 5% by weight of the total composition, thereby rendering the crosslinked composition capable of being foamed during further thermal processing.

3. The method of claim 1 wherein the thermoplastic copolymer is an ABS graft copolymer.

4. A method of making a crosslinked, thermally processable and foamable thermoplastic composition comprising the steps of (1) melt mixing a blend comprising a thermoplastic copolymer selected from the group styrene-acrylonitrile copolymers, graft copolymers of styrene and acrylonitrile on rubbery diene substrates and mixtures thereof, an epoxy resin in the amount of from 0.1 to about 1.0% by weight of the said composition, and an acidic curing agent for the epoxy resin in the amount of from about 0.1 to about 1.0% by weight of the said composition at a temperature greater than 350°F. to thereby cure and crosslink said blend, (2) cooling and pelletizing said crosslinked blend, and (3) mixing said pelletized blend with a foaming agent in the amount of from 0.1 to 5% by weight of said composition.

5. The method of claim 4 wherein the thermoplastic copolymer is an ABS graft copolymer.

6. A crosslinked thermoplastic composition capable of being thermally-processed comprising a blend of (1) a thermoplastic copolymer selected from the group styreneacrylonitrile copolymers, graft copolymers of styrene and acrylonitrile on rubbery polydiene substrates, and mixtures thereof, (2) an epoxy resin in the amount of from about 0.1% to about 1.0% by weight of the said composition and (3) an acidic curing agent for the epoxy resin in the amount of about 0.1% to about 1.0% by weight of the said composition, said blend being melt mixed at a temperature above 350°F. to thereby obtain a cured, crosslinked material.

7. The composition of claim 6 wherein the thermoplastic copolymer is an ABS graft copolymer.

8. A crosslinked thermoplastic composition capable of being thermally-processed and foamed comprising a blend of (1) a thermoplastic copolymer selected from the group styrene-acrylonitrile copolymers, graft copolymers of styrene and acrylonitrile on rubbery diene substrates and mixtures thereof, (2) an epoxy resin in the amount from about 0.1% to about 1.0% by weight of the said composition and (3) an acidic curing agent for the epoxy resin in the amount of about 0.1% to about 1.0% by weight of the said composition, said blend being melt mixed at a temperature above 350°F. to thereby obtain a cured, crosslinked material and said crosslinked material then further mixed with from 0.1 to 5% by weight of a foaming agent, thereby obtaining a thermoplastic crosslinked composition capable of being foamed by further thermal processing at a temperature above the decomposition temperature of the foaming agent.

9. The composition of claim 7 wherein said blend further comprises a thermoplastic resin selected from the group polyvinylchloride, polycarbonate, and chlorinated polyethylene.

* * * * *